(12) United States Patent
Park et al.

(10) Patent No.: US 9,354,383 B2
(45) Date of Patent: May 31, 2016

(54) DISPLAY DEVICE INCLUDING AN ADHESIVE MEMBER

(71) Applicant: Samsung Display Co., Ltd., Yongin, Gyeonggi-Do (KR)

(72) Inventors: Young-Min Park, Hwaseong-si (KR); Jaehyun Chae, Hwaseong-si (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 138 days.

(21) Appl. No.: 14/102,324

(22) Filed: Dec. 10, 2013

(65) Prior Publication Data

US 2014/0355301 A1    Dec. 4, 2014

(30) Foreign Application Priority Data

May 31, 2013  (KR) .................. 10-2013-0062869

(51) Int. Cl.
  *F21V 8/00* (2006.01)
(52) U.S. Cl.
  CPC .............. *G02B 6/0085* (2013.01); *G02B 6/009* (2013.01); *G02B 6/0031* (2013.01); *G02B 6/0093* (2013.01)
(58) Field of Classification Search
  CPC .. G02B 6/0085; G02B 6/0083; G02B 6/0091; F21Y 2101/002
  See application file for complete search history.

(56) References Cited

U.S. PATENT DOCUMENTS

| | | | | |
|---|---|---|---|---|
| 6,665,187 | B1 * | 12/2003 | Alcoe et al. | 361/719 |
| 6,676,268 | B2 * | 1/2004 | Ohkawa | 362/613 |
| 7,284,882 | B2 * | 10/2007 | Burkholder | 362/294 |
| 7,661,866 | B2 * | 2/2010 | Kaneko et al. | 362/612 |
| 2009/0185362 | A1 | 7/2009 | Hong et al. | |
| 2011/0025942 | A1 | 2/2011 | Lee | |
| 2013/0100694 | A1 * | 4/2013 | Chen | 362/602 |

FOREIGN PATENT DOCUMENTS

| | | |
|---|---|---|
| JP | 2012-230214 A | 11/2012 |
| KR | 10-1002915 B1 | 12/2010 |
| KR | 10-1094348 B1 | 12/2011 |
| KR | 10-1136316 B1 | 4/2012 |
| KR | 10-2012-0049704 A | 5/2012 |
| WO | WO 2011001718 A1 * | 1/2011 |

* cited by examiner

*Primary Examiner* — Robert May
(74) *Attorney, Agent, or Firm* — Knobbe, Martens, Olson & Bear, LLP (57) ABSTRACT

A display device is disclosed. In one aspect, the display device includes a protective member, a display panel accommodated in the protective member, a light guide member including a light incident surface, a heat discharge member including a support surface facing the light incident surface, and a light source disposed on the support surface to supply light to the light incident surface. The light source includes a light-emitting device disposed on one surface of a circuit board, the circuit board including a first area substantially overlapping the light-emitting device and a second area adjacent to the first area, a first adhesive member disposed between the other surface of the circuit board and the support surface and substantially overlapping the first area, and a second adhesive member disposed to substantially overlap the second area. The first adhesive member has a higher heat conductivity than the second adhesive member.

23 Claims, 8 Drawing Sheets

DISPLAY DEVICE INCLUDING AN ADHESIVE MEMBER

CROSS-REFERENCE TO RELATED APPLICATIONS

This U.S. non-provisional patent application claims priority under 35 U.S.C. §119 of Korean Patent Application No. 10-2013-0062869, filed on May 31, 2013, the contents of which are hereby incorporated by reference in its entirety.

BACKGROUND

1. Field

The described technology generally relates to a display device, and more particularly, to a display device capable of reducing the manufacturing cost thereof and simplifying the manufacturing process thereof.

2. Description of the Related Technology

Display devices are generally classified into transmissive, transflective, and reflective types. The transmissive and transflective type display devices typically include a display panel which displays an image and a light source which supplies light to the display panel.

The light source typically includes a circuit board and a plurality of light-emitting devices mounted on the circuit board. A light source may be provided as a light-emitting diode package when configured to include light-emitting diodes as the light emitting devices. The light-emitting diode package is typically coupled to a heat discharge member or a protective member prior to being used in the display device.

SUMMARY OF CERTAIN INVENTIVE ASPECTS

One inventive aspect is a display device including an adhesive member with improved heat discharge and improved adhesiveness to reduce the manufacturing cost thereof and to simplify the manufacturing process thereof.

Another aspect is a display device including a protective member, a display panel accommodated in the protective member, a light guide member disposed under the display panel and including a light incident surface, a heat discharge member including a support surface facing the light incident surface, and a light source disposed on the support surface to supply light to the light incident surface.

The light source includes a circuit board, a first adhesive member disposed between one surface of the circuit board and the support surface, a second adhesive member disposed between the one surface of the circuit board and the support surface adjacent to the first adhesive member and having a higher heat conductivity than the first adhesive member, and a light-emitting device disposed on the other surface of the circuit board to substantially overlap with the second adhesive member.

The first adhesive member includes a material having a higher adhesive strength than the second adhesive member. The second adhesive member includes a phase change material to absorb heat generated from the light-emitting device. The first adhesive member is a heat conductive adhesive tape.

The light guide member includes a first surface through which the light incident the light incident surface exits toward the display panel, a second surface facing the first surface, and a plurality of connection surfaces that connect the first surface and the second surface, and the light incident surface is disposed at one of the connection surfaces.

The light incident surface is disposed at the connection surface positioned at a corner of the light guide member.

The heat discharge member includes a bottom portion that supports a portion of the light guide member and a sidewall portion extended from the bottom portion and including the support surface.

The light source further includes a reflective cup mounted on the other surface of the circuit board to surround the light-emitting device. The light source further includes a molding agent filled in a space defined by the reflective cup to protect the light-emitting device.

The first adhesive member includes a first area disposed adjacent to one end of the second adhesive member and a second area disposed adjacent to the other end of the second adhesive member. The first adhesive member has a closed-loop shape to surround the second adhesive member.

Another aspect is a display device including a protective member, a display panel accommodated in the protective member, a light guide member disposed under the display panel and including a light incident surface, a heat discharge member including a support surface facing the light incident surface, and a light source disposed on the support surface to supply light to the light incident surface.

The light source includes a circuit board, an adhesive member disposed between one surface of the circuit board and the support surface and including a first adhesive part in which a first adhesive material is disposed and a second adhesive part in which a second adhesive material having a higher heat conductivity than the first adhesive material is disposed, and a light-emitting device disposed on the other surface of the circuit board to substantially overlap with the second adhesive part and electrically connected to the circuit board.

The first adhesive material has a higher adhesive strength than the second adhesive material.

The second adhesive part is disposed at a center portion of the other surface of the circuit board, a first area of the first adhesive part is disposed adjacent to one end of the second adhesive member, and a second area of the first adhesive part is disposed adjacent to the other end of the second adhesive member.

The first adhesive part has a closed-loop shape to surround the second adhesive part.

The first adhesive material includes a heat conductive adhesive material and the second adhesive material comprises a phase change material.

Another aspect is a display device including a display panel, a light guide member disposed under the display panel and including a light incident surface, a protective member that accommodates the display panel and the light guide member and includes a support surface facing the light incident surface, and a light source disposed on the support surface to supply light to the light incident surface.

The light source includes a circuit board, a first adhesive member disposed between one surface of the circuit board and the support surface, a second adhesive member disposed between the one surface of the circuit board and the support surface adjacent to the first adhesive member, the second adhesive member is disposed on a same layer as the first adhesive member and has a higher heat conductivity than the first adhesive member, and a light-emitting device disposed on the other surface of the circuit board to substantially overlap with the second adhesive member.

The protective member includes a lower protective member, an upper protective member, and an intermediate protective member.

The support surface is disposed on the lower protective member and the light source is coupled to the lower protective member.

The support surface is disposed on the intermediate protective member and the light source is coupled to the intermediate protective member.

According to some embodiments, the light source may have improved heat discharge and improved adhesiveness and is attached to the protective member or the heat discharge member. Thus, the display device does not need to have a separate coupling member to hold the light source. In addition, the light source discharges the heat generated therefrom through the adhesive member. Therefore, the manufacturing process of the display device may be simplified and the manufacturing cost of the display device may be reduced.

BRIEF DESCRIPTION OF THE DRAWINGS

The above described and other advantages of the described technology will become readily apparent with reference to the following detailed description when considered in conjunction with the accompanying drawings.

DETAILED DESCRIPTION OF CERTAIN INVENTIVE EMBODIMENTS

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the described technology.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein should be interpreted accordingly.

The terminology used herein is for the purpose of describing particular embodiments only and is not intended to be limiting of the described technology. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which the described technology belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the described technology will be explained in detail with reference to the accompanying drawings.

Figure 1:
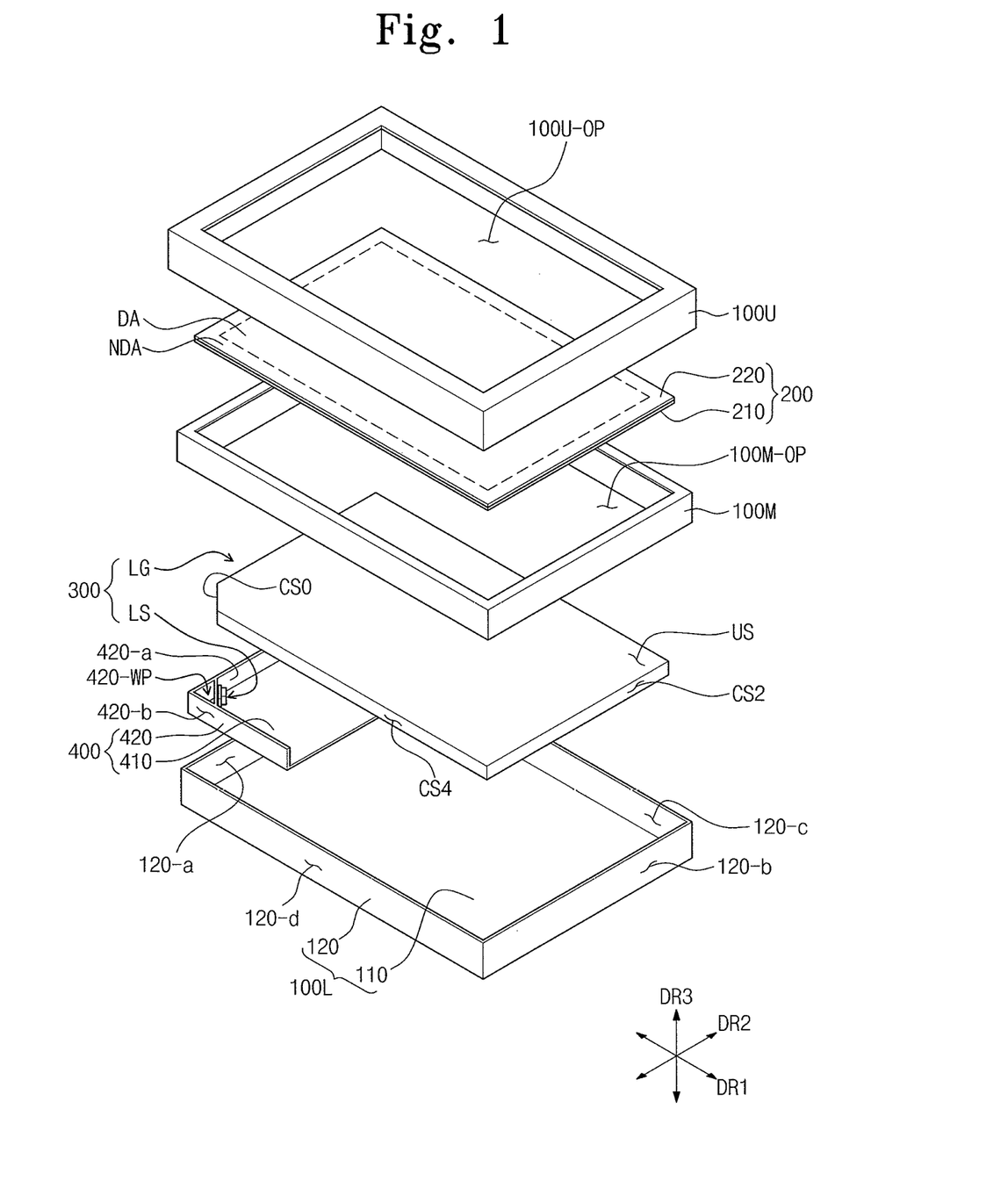
FIG. 1 is an exploded perspective view showing a display device according to an exemplary embodiment.

FIG. 1 is an exploded perspective view showing a display device according to an exemplary embodiment of the described technology.

Referring to FIG. 1, a display device includes protective members 100U, 100M, and 100L, a display panel 200, and a backlight unit 300.

The protective members 100U, 100M, and 100L include an upper protective member 100U, a lower protective member 100L, and an intermediate protective member 100M disposed between the upper protective member 100U and the lower protective member 100L, which are coupled to each other. The upper protective member 100U and the lower protective member 100L accommodate other elements to protect the accommodated elements.

The upper protective member 100U is disposed on the display panel 200. The upper protective member 100U includes an opening 100U-OP. The opening 100U-OP exposes an area of the display panel 200, e.g., a display area DA in which an image is displayed.

The upper protective member 100U is disposed to substantially overlap with the other area of the display panel 200, e.g., a non-display area NDA. The non-display area NDA is disposed adjacent to the display area DA and does not display an image.

The lower protective member 100L accommodates a heat discharge member 400 and the backlight unit 300. The lower protective member 100L includes a bottom portion 110 and a sidewall portion 120 extended upward from the bottom portion 110.

In some embodiments, the bottom portion 110 has a substantially rectangular shape when viewed in a plan view. The sidewall portion 120 is extended upward from the four sides of the bottom portion 110. The sidewall portion 120 may be divided into four portions respectively corresponding to the four sides of the bottom portion 120. In other embodiments, at least one of the bottom portion 110, the display panel 200 or protective members 100U, 100M, 100L have other polygonal shape. However, for the convenience of description, the substantially rectangular embodiment will be described.

The four portions include first sidewalls 120-a and 120-b facing each other in a first direction DR1 and second sidewalls 120-c and 120-d facing each other in a second direction DR2. The four portions surround the bottom portion 110.

The intermediate protective member 100M is disposed between the upper protective member 100U and the lower protective member 100L. The intermediate protective member 100M has a substantially rectangular frame shape to substantially overlap the non-display area NDA of the display panel 200. The intermediate protective member 100M includes an opening 100M-OP and supports the display panel 200.

The display panel 200 receives light from the backlight unit 300 and displays an image. The display panel 200 may be a transmissive type display panel or a transflective type display panel. For instance, the display panel 200 may be a liquid crystal display panel, an electrophoretic display panel, or an electrowetting display panel.

In the present exemplary embodiment, the display panel 200 includes a first substrate 210, a second substrate 220, and a liquid crystal layer (not shown) interposed between the first substrate 210 and the second substrate 220.

The backlight unit 300 includes a light source LS which emits light and a light guide member LG which guides the light from the light source LS to the display panel 200.

The light guide member LG is disposed under the display panel 200. The light guide member LG includes a first surface US, a second surface (not shown), and a plurality of connection surfaces to connect the first surface US to the second surface.

The light guide member LG has a substantially rectangular plate shape. The light incident the light guide member LG exits through the first surface US. The second surface (not shown) faces the first surface US in the direction the thickness of the light guide member LG extends.

The connection surfaces include two first side surfaces facing each other in the first direction DR1, two second side surfaces facing each other in the second direction DR2, and a connection surface used to connect one first side surface of the two first side surfaces and one second side surface of the two second side surfaces.

The first direction DR1 is substantially perpendicular to the second direction DR2. FIG. 1 shows one first side surface CS2, one second side surface CS4, and the connection surface CS0 that connects one first side surface (not shown) facing the other first side surface (CS2) and the second side surface CS4.

The connection surface CS0 faces the light source LS. The connection surface CS0 facing the light source LS will be referred to as a light incident surface of the light guide member LG. The light incident surface CS0 is disposed at an edge of the light guide member LG, but is not limited thereto or thereby. That is, the light incident surface may be connected between the other connection surfaces as long as the light incident surface faces the light source LS.

As shown in FIG. 1, the display device further includes a heat discharge member 400.

Figure 2:
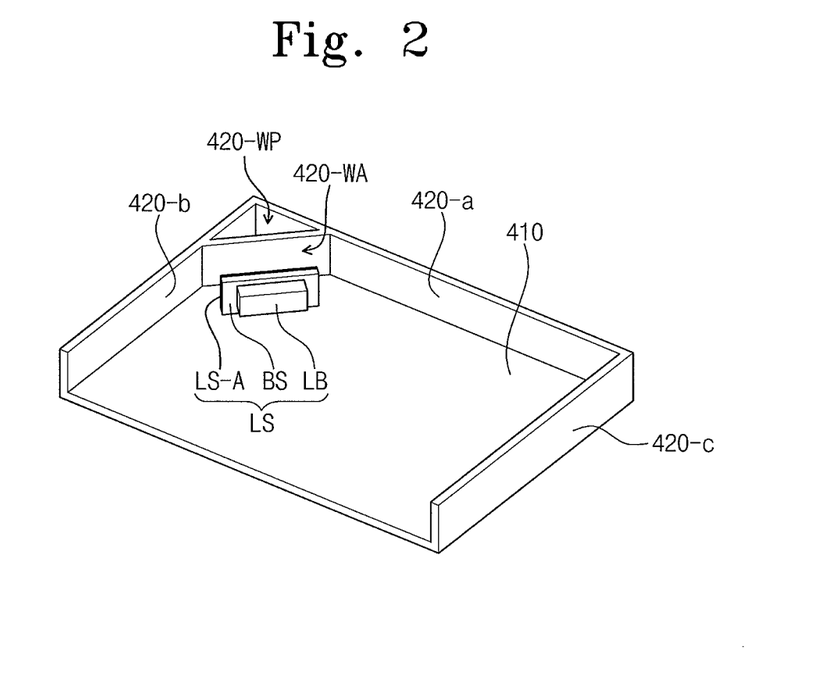
FIG. 2 is a perspective view showing a heat discharge member and a light source shown in FIG. 1.

FIG. 2 is a perspective view showing the heat discharge member 400 and the light source LS shown in FIG. 1.

Referring to FIG. 2, the heat discharge member 400 is coupled to the lower protective member 100L and holds a portion of the back light unit 300. Thus, the heat discharge member 400 includes a support surface coupled to the light source LS.

The heat discharge member 400 includes a bottom portion 410 (hereinafter, referred to as a heat discharge bottom portion) and a sidewall portion 420 (hereinafter, referred to as a heat discharge sidewall portion) extended upward from the heat discharge bottom portion 410.

The heat discharge bottom portion 410 is disposed on the bottom portion 110 and overlaps a portion of the light guide member LG. The display device may further include a coupling member (not shown). The coupling member fixes the heat discharge member 400 to the lower protective member 100L. For instance, the heat discharge bottom portion 410 may be fixed to the bottom portion 110 by various coupling members, e.g., a screw.

As shown in FIG. 2, the heat discharge sidewall portion 420 includes a first heat discharge portion 420-a extended in the first direction DR1 and a second heat discharge portion 420-b connected to the first heat discharge portion 420-a and extended in the second direction DR2.

In addition, the heat discharge sidewall portion 420 further includes a third heat discharge portion 420-c facing the second heat discharge portion 420-b and connected to the first heat discharge portion 420-a. As the area in which the heat discharge member 400 makes contact with the backlight unit 300 becomes larger, the heat discharge properties of the display device may be improved.

The heat discharge sidewall portion 420 includes a connection surface 420-WA that connects an inner side surface of the first heat discharge member 420-a and an inner side surface of the second heat discharge member 420-b. The connection surface 420-WA will be referred to as the support surface. The support surface 420-WA is coupled to the light source LS. The support surface 420-WA supports the light source LS and a portion of the light guide member LG.

The heat discharge member 400 includes a heat discharge edge portion 420-WP surrounded by the connection surface 420-WA, a portion of the first heat discharge portion 420-a, and a portion of the second heat discharge portion 420-b. The heat discharge edge portion 420-WP may be filled with silicon in order to support the connection surface 420-WA.

Figure 3:
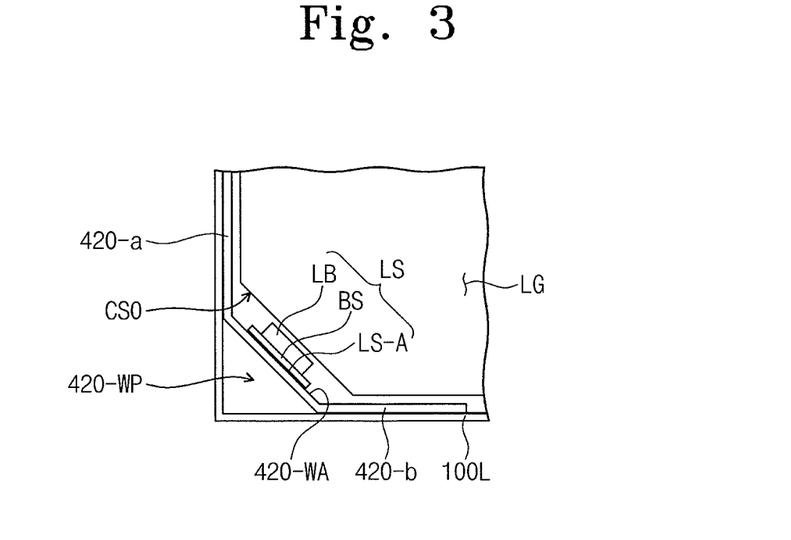
FIG. 3 is an enlarged plan view showing an area in which a backlight unit is coupled to the heat discharge member.

FIG. 3 is an enlarged plan view showing an area in which the backlight unit 300 is coupled to the heat discharge member 400.

Referring to FIG. 3, the heat discharge sidewall portion 420 of the heat discharge member 400 and the sidewall portion 120 of the lower protective member 100L are arranged to face each other and to connect to each other.

The light source LS is coupled to the support surface 420-WA of the heat discharge member 400. The light guide member LG is disposed to be spaced apart from the light source LS by a predetermined distance. The light incident surface CS0 faces a light-emitting block LB of the light source LS. The heat discharge member 400 is disposed under the light guide member LG such that the heat discharge bottom portion 410 overlaps a portion of the light guide member LG.

Figure 4:
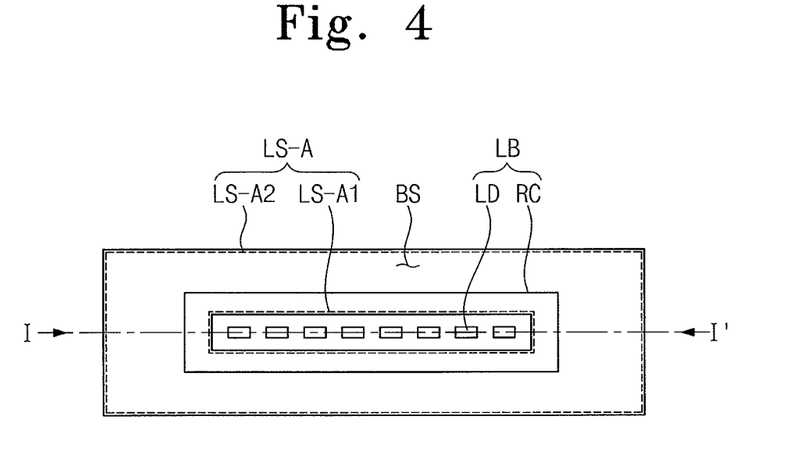
FIG. 4 is a plan view showing a light source according to an exemplary embodiment.
Figure 5:
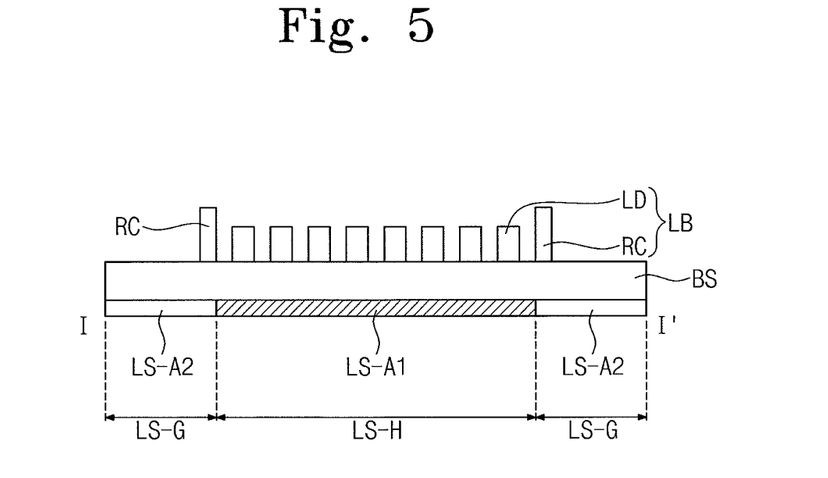
FIG. 5 is a cross-sectional view of the light source taken along line I-I' of FIG. 4.

FIG. 4 is a plan view showing the light source LS according to an exemplary embodiment and FIG. 5 is a cross-sectional view taken along line I-I' to show the light source LS of FIG. 4.

Referring to FIGS. 4 and 5, the light source LS includes the light-emitting block LB, a circuit board BS, and a heat discharge adhesive member. The circuit board BS may further include a base substrate (not shown). The circuit board BS may be configured to include a plurality of circuit layers alternately stacked one on another with an insulating layer interposed therebetween.

The heat discharge adhesive member LS-A is disposed on a lower surface of the circuit board BS. The heat discharge adhesive member LS-A includes a first adhesive member LS-A1 and a second adhesive member LS-A2, which each have different heat conductivities.

The first adhesive member LS-A1 includes a first adhesive material and the second adhesive member LS-A2 includes a second adhesive material. The first adhesive material may have a heat conductivity higher than that of the second adhesive material.

The first adhesive material of the first adhesive member LS-A1 may include an organic material, e.g., tetradecane, octadecane, nonadecane, etc., or an inorganic material, e.g., calcium chloride. For instance, the first adhesive material may include a phase-change material to lower the temperature of the light-emitting block LB.

The phase change material may change its shape or state prior to being cured. Therefore, the first adhesive material LS-A1 formed of the phase change material enhances the adhesive force between the support surface 420-WA and the circuit board BS.

The second adhesive material of the second adhesive member LS-A2 has an adhesive force higher than that of the first adhesive material. The second adhesive member LS-A2 may include an adhesive resin including ceramic particles or silicon particles. For instance, the second adhesive member LS-A2 may be a conductive adhesive sheet or a heat conductive adhesive tape.

As shown in FIGS. 4 and 5, the light-emitting block LB is mounted on an upper surface of the circuit board BS. The light-emitting block LB includes at least one light-emitting device LD and a reflective cup RC. The light-emitting device LD includes a light-emitting diode LED. The reflective cup RC is disposed around the light-emitting device LD to surround the light-emitting device LD.

The reflective cup RC allows the light emitted from the light-emitting device LD to exit through the upper portion of the light source LS. The reflective cup RC prevents the light emitting from the light-emitting device LD from leaking to the outside of the light source LS. The reflective cup RC may have a height higher than that of the light-emitting device LD.

The reflective cup RC may include a metal that reflects light. For instance, the reflective cup RC may include silver, gold, copper, or a metal plated with silver, gold, or copper.

The reflective cup RC may further include a cover portion (not shown) to cover the light-emitting device LD. The cover portion protects the light-emitting device LD. The cover portion may include a transparent material with high transmittance, e.g., glass, plastic, etc., to reduce a loss in the amount of the light emitted from the light-emitting device LD. A space defined by the reflective cup RC and the cover portion may be filled with a molding agent to protect the light-emitting device LD.

As shown in FIGS. 4 and 5, the light-emitting device LD is mounted on the circuit board BS to substantially overlap the first adhesive member LS-A1. The light-emitting device LD emits light in response to a driving voltage applied through first and second electrodes. Although not shown in figures, the first and second electrodes are connected to different electrodes of the circuit board BS.

Although not shown in figures, the light-emitting device LD has a structure in which an n-type semiconductor layer, an active layer, and a p-type semiconductor layer are sequentially stacked. When the driving voltage is applied to the light-emitting device LD, holes and electrons are combined with each other, and thus light is generated by the recombination between the holes and the electrons.

Although not shown in figures, the light-emitting block LB may further include a body portion (not shown) provided with the reflective cup RC. The body portion is disposed between the reflective cup RC and the circuit board BS. Accordingly, the light-emitting device LD is mounted on the body portion.

The light-emitting device LD may be mounted on the body portion using a resin-based adhesive sheet (not shown) or a conductive adhesive sheet (not shown). The body portion includes a first lead to connect the first electrode to the circuit board BS and a second lead to connect the second electrode to the circuit board BS.

Figure 6:
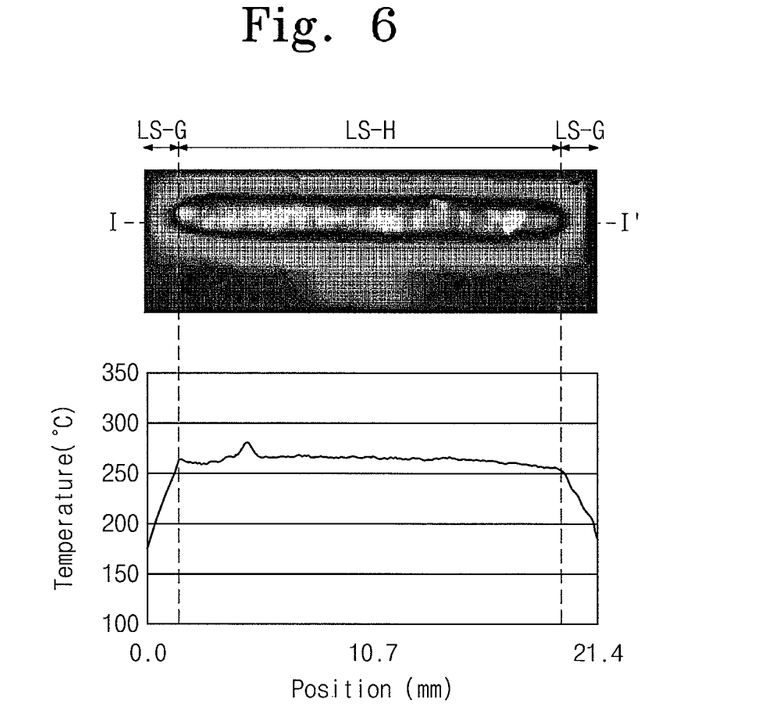
FIG. 6 is a graph showing temperature as a function of position for a cross-section of the light source shown in FIG. 4.

FIG. 6 is a graph showing temperature as a function of position for a cross-section of the light source shown in FIG. 4. Hereinafter, the arrangement of the first and second adhesive members LS-A1 and LS-A2 will be described in detail with reference to FIGS. 5 and 6.

Referring to FIG. 6, the cross-section of the light source LS is divided into a first area of the light source LS-H in which a temperature substantially equal to or greater than about 250° C. is generated and a second area of the light source LS-G adjacent to the first area of the light source LS-H. The temperature rapidly decreases in the second area of the light source LS-G as the position is farther away from the first area of the light source LS-H.

The light-emitting device LD emits light in response to the driving voltage and generates heat. Thus, when the light-emitting device LD is in a driving state, the first area of the light source LS-H has a temperature higher than that of the second area of the light source LS-G and corresponds to the area in which the light-emitting device LD is disposed.

The first adhesive member LS-A1 is disposed in the first area LS-H. The first adhesive member LS-A1 has a size to cover at least the first area LS-A1. As described above, the first adhesive member LS-A1 has a heat conductivity higher than that of the second adhesive member LS-A2, and thus the first adhesive member LS-A1 discharges the heat generated from the light source LS. As a result, the temperature of the light source LS may be lowered.

The light-emitting device LD is not disposed in the area corresponding to the second area LS-G. Therefore, when the light-emitting device LD is in the driving state, the second area of the light source LS-G has a temperature lower than that of the first area of the light source LS-H. The second adhesive member LS-A2 is disposed in the second area of the light source LS-G.

As described above, the second adhesive material of the second adhesive member LS-A2 has a heat conductivity lower than that of the first adhesive material, but has a superior adhesive property. Accordingly, the second adhesive member LS-A2 improves the adhesive properties of the light source LS.

Figure 7A:
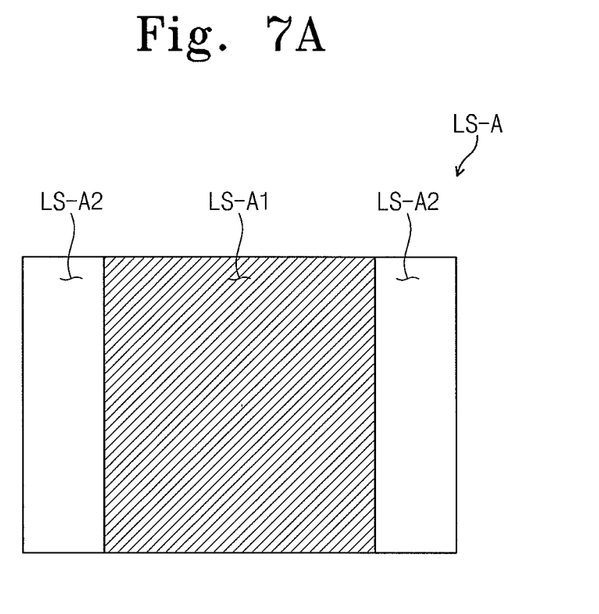
FIGS. 7A to 7C are plan views showing various heat discharge adhesive members according to exemplary embodiments.
Figure 7B:
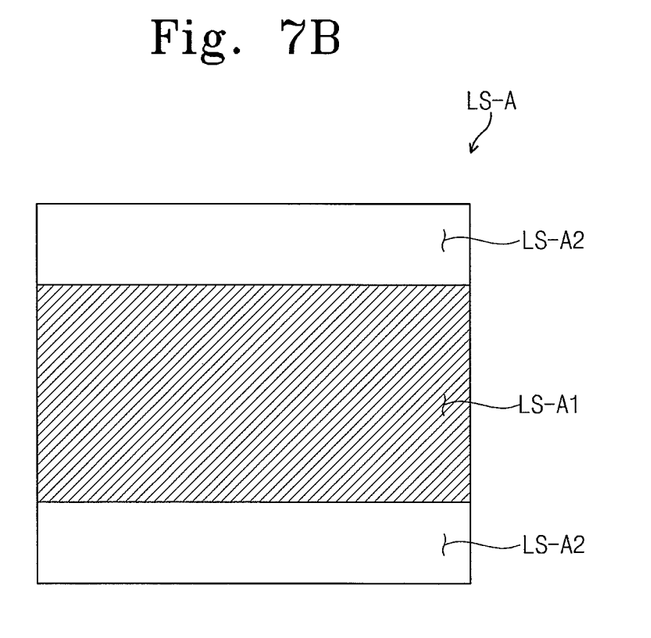
Figure 7C:
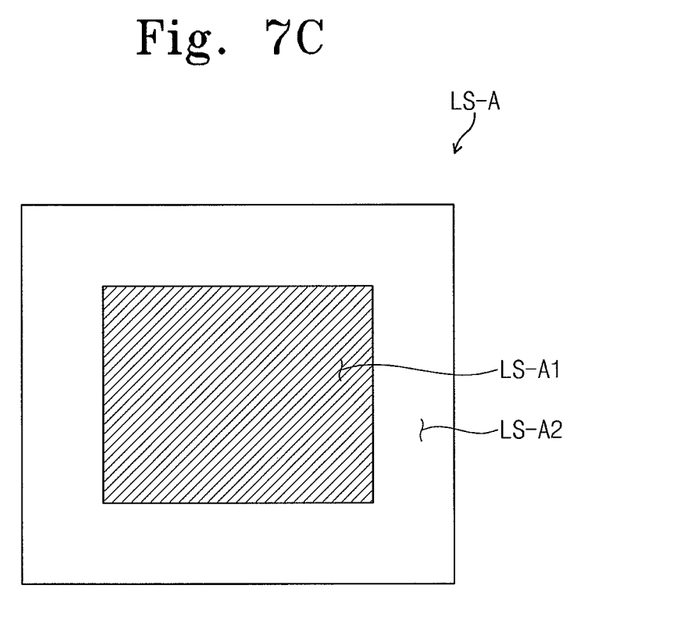

FIGS. 7A to 7C are plan views showing various heat discharge adhesive members according to exemplary embodiments.

Referring to FIGS. 7A to 7C, the first adhesive member LS-A1 is disposed in the center portion of the circuit board BS to correspond to the first area LS-H.

The second adhesive member LS-A2 is disposed on the circuit board BS to cover the area in which the first adhesive member LS-A1 is not disposed. The light source LS is stably coupled to the support surface 420-WA by the second adhesive member LS-A2.

As shown in FIG. 7A, the second adhesive member LS-A2 may cover left and right areas of the circuit board BS while the first adhesive member LS-A1 is interposed therebetween.

As another example, as shown in FIG. 7B, the second adhesive member LS-A2 may cover upper and lower areas of the circuit board BS while the first adhesive member LS-A1 is interposed therebetween.

As another example, as shown in FIG. 7C, the second adhesive member LS-A2 is disposed around the first area of the light source LS-G in a closed-loop shape. For instance, the second adhesive member LS-A2 has a frame shape to surround the first adhesive member LS-A1.

As described above, the second adhesive member LS-A2 covers the area of the circuit board except for the area in which the first adhesive member LS-A1 is disposed. The first adhesive member LS-A1 and the second adhesive member LS-A2 may be disposed on the same layer.

Although not shown in figures, the second adhesive member LS-A2 may be disposed on the first adhesive member LS-A1. In this case, the second adhesive member LS-A2 may overlap with all or a portion of the first adhesive member LS-A1.

In some embodiments, the area of the second adhesive member LS-A2 has an influence on the total adhesive force between the light source LS and the support surface 420-WA. That is, as the area of the second adhesive member LS-A2 increases, the light source LS may be more stably coupled to the support surface 420-WA.

The heat discharge adhesive member LS-A is provided as one layer divided by a plurality of adhesive parts. The plurality of adhesive parts comprises a first adhesive part corresponding to the first adhesive member LS-A1 and a second adhesive part corresponding to the second adhesive member LS-A2. The first adhesive part and the second adhesive part may be integrally formed with each other. In this case, the heat discharge adhesive member LS-A is provided as a single unitary and individual layer and configured to include a plurality of adhesive parts successively connected to each other.

The first adhesive part includes the first adhesive material and has a shape corresponding to the first adhesive member LS-A1. In addition, the second adhesive part includes the second adhesive material and has a shape corresponding to the second adhesive member LS-A2.

Figure 8:
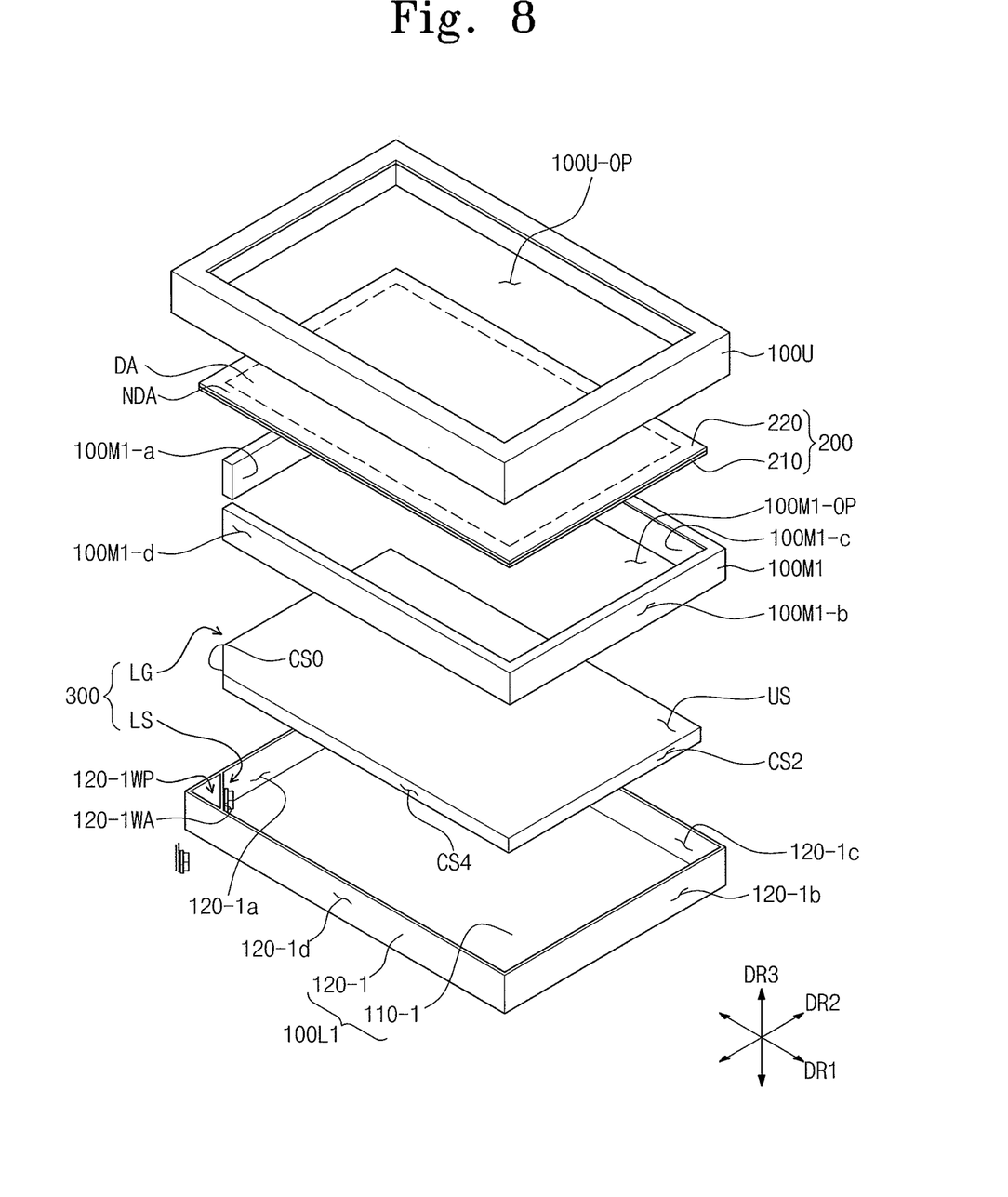
FIG. 8 is an exploded perspective view showing a display device according to another exemplary embodiment.

FIG. 8 is an exploded perspective view showing a display device according to another exemplary embodiment of the described technology. In FIG. 8, the same reference numerals denote the same elements in FIGS. 1 to 7, and thus detailed descriptions of the same elements will be omitted.

Referring to FIG. 8, the backlight unit 300 may be coupled to a lower protective member 100L1. The lower protective member 100L1 accommodates the backlight unit 300. The lower protective member 100L1 includes a bottom portion 110-1 and a sidewall portion 120-1 extended upward from the bottom portion 110-1.

The bottom portion 110-1 may have a substantially rectangular shape when viewed in a plan view. The sidewall portion 120-1 includes sidewalls respectively extended from the four sides of the bottom portion 110-1.

The sidewalls include two first sidewalls 120-1a and 120-1b facing each other in the first direction DR1 and two second sidewalls 120-1c and 120-1d facing each other in the second direction DR2. The sidewalls are connected to each other to face respective side surfaces of the light guide member LG.

In addition, the lower protective member 100L1 includes a connection surface 120-1 WA to connect an inner surface of a first sidewall 120-1a and an inner surface of a second sidewall 120-1d. The connection surface 120-1WA is referred to as a support surface.

As described above, the support surface 120-1WA is coupled to the light source LS. The light source LS is stably coupled to the support surface 120-1WA by the heat discharge adhesive member (not shown).

The lower protective member 100L1 includes an edge portion 120-1WP defined by the connection surface 120-1WA, a portion of the first sidewall 120-1a, and a portion of the second sidewall 120-1d. The edge portion 120-1WP is filled with silicon material to maintain the shape of the lower protective member 100L1. The connection surface 120-WA may stably support the light source LS.

The intermediate protective member 100M1 is divided into a plurality of sidewalls. The sidewalls are configured to include two first sidewalls 100M1-a and 100M1-b facing each other in the first direction DR1 and two second sidewalls 100M1-c and 100M1-d facing each other in the second direction DR2.

One first sidewall 100M1-a has a length shorter than that of the other first sidewall 100M1-b, and one second sidewall 100M1-c has a length shorter than that of the other second sidewall 100M1-d. The first and second sidewalls 100M2-a and 100M1-c are disposed to be spaced apart from each other. The intermediate protective member 100M1 exposes the light incident surface CS0 of the light guide member LG to the light source LS through the space between the first and second sidewalls 100M1-a and 100M1-c.

In some embodiments, the lengths of the first and second sidewalls 100M1-a and 100M1-c influence the supporting of the display panel 200. Thus, the first and second sidewalls 100M1-a and 100M1-c have a maximum length such that the first and second sidewalls 100M1-a and 100M1-c do not overlap the area in which the light source LS is disposed.

Although not shown in figures, the intermediate protective member 100M1 may have a frame shape substantially overlapping the non-display area NDA of the display panel 200. In this case, the intermediate protective member 100M1 is partially cut-away in the area in which the first sidewall 100M1-a and the second sidewall 100M1-c are connected to each other. The intermediate protective layer 100M1 stably supports the display panel 200 and exposes the light incident surface CS0 to the light source LS through the cut-away portion thereof.

The display device shown in FIG. 8 does not need to have a heat discharge member 400 (refer to FIG. 1). The light source LS is directly coupled to the lower protective member 100L1 and supported by the lower protective member 100L1. Since the first adhesive member LS-A1 of the light source LS has a heat discharging property, the display device may obtain the same properties as a display device including the heat discharge member. Therefore, the manufacturing process of the display device may be simplified and a manufacturing cost of the display device may be reduced.

Figure 9:
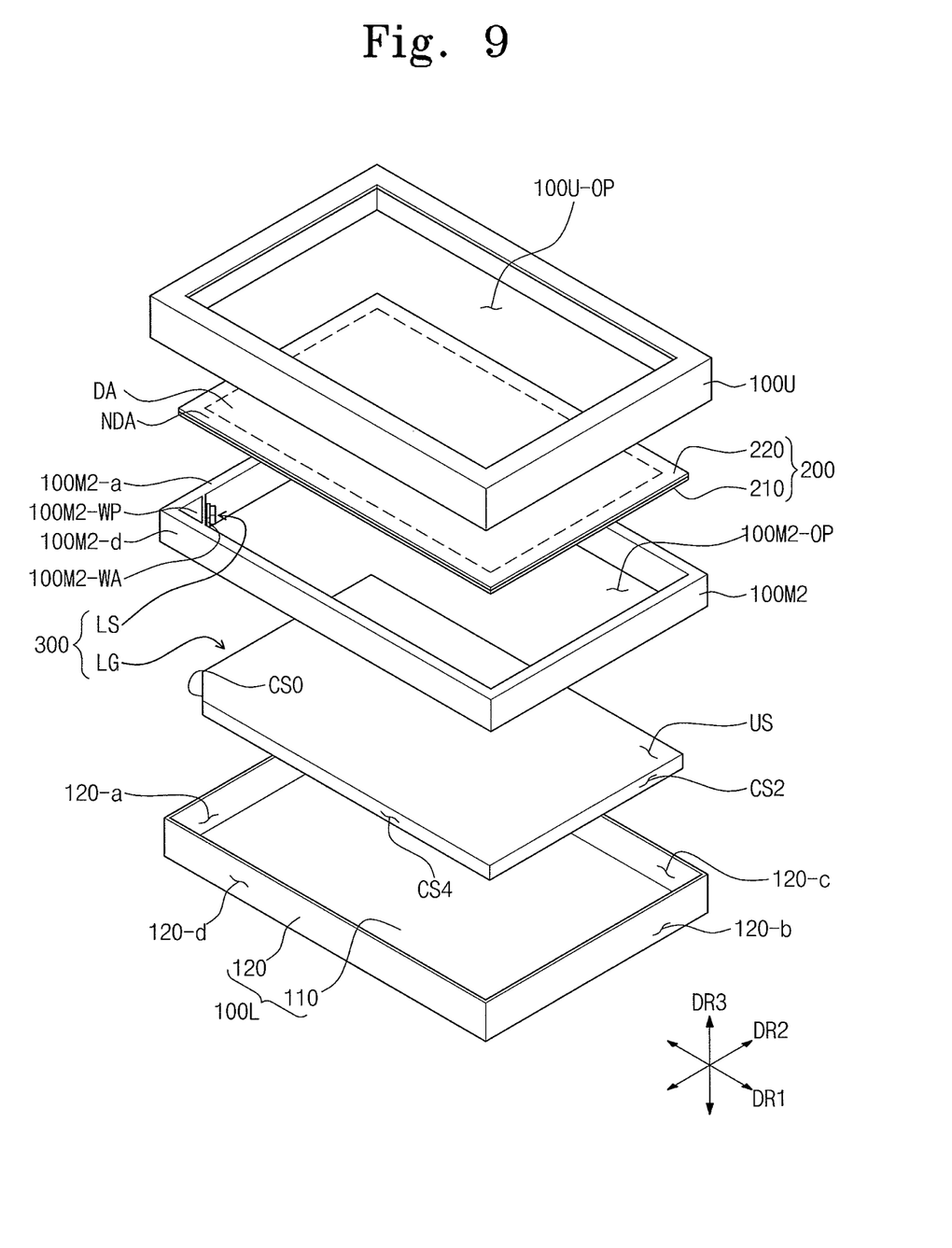
FIG. 9 is an exploded perspective view showing a display device according to yet another exemplary embodiment.

FIG. 9 is an exploded perspective view showing a display device according to another exemplary embodiment. In FIG. 9, the same reference numerals denote the same elements in FIGS. 1 to 8, and thus detailed descriptions of the same elements will be omitted.

Referring to FIG. 9, the display device includes an intermediate protective member 100M2. The light source LS is coupled to the intermediate protective member 100M2. Accordingly, the intermediate protective member 100M2 includes a support surface coupled to the light source LS.

The intermediate protective member 100M2 includes an opening 100M2-OP formed therethrough to correspond to the display area DA of the display panel 200.

The intermediate protective member 100M2 includes a plurality of sidewalls. The sidewalls includes two first sidewalls 100M2-a and 100M2-b facing each other in the first direction DR1 and two second sidewalls 100M2-c and 100M2-d facing each other in the second direction DR2. The sidewalls 100M2-a, to 100M2-d face respective side surfaces of the light guide member LG.

In addition, the intermediate protective member 100M2 includes a connection surface 100M2-WA to connect an inner side of the first sidewall 100M2-a and an inner side of the second sidewall 100M2-d. The connection surface 100M2-WA serves as the support surface.

Thus, the light source LS is coupled to the connection surface 100M2-WA. The connection surface 100M2-WA may stably support the light source LS using the heat discharge adhesive member without using separate coupling members, e.g., bolts.

The intermediate protective member 100M2 includes an edge portion 100M2-WP surrounded by the connection surface 100M2-WA, a portion of the first sidewall 100M2-a, and a portion of the second sidewall 100M2-d. The edge portion 100M2-WP may be filled with a molding agent to maintain the shape of the intermediate protective member 100M2. Therefore, the connection surface 100M2-WA may stably support the light source LS.

Although exemplary embodiments have been described, it is understood that the present invention should not be limited to these exemplary embodiments but various changes and modifications can be made by one ordinary skilled in the art within the spirit and scope of the described technology as defined by the accompanying claims.

What is claimed is:

1. A display device comprising:
   a display panel;
   a light guide member disposed below the display panel and including a light incident surface;
   a heat discharge member including a support surface; and
   a light source coupled with the heat discharge member and configured to supply light to the light incident surface, the light source comprising:
   a circuit board including first and second surfaces opposing each other;
   a first adhesive member disposed between the first surface of the circuit board and the support surface, the first adhesive member formed of a first material;
   a second adhesive member disposed between the first surface of the circuit board and the support surface adjacent to the first adhesive member in a plan view, the second adhesive member formed of a second material different from the first material, wherein the first material has a higher heat conductivity than the second material; and
   a light-emitting device disposed on the second surface of the circuit board to substantially overlap the first adhesive member.

2. The display device of claim 1,
   wherein the support surface at least partially faces the light incident surface, and
   wherein the light source is disposed directly on the support surface.

3. The display device of claim 1, wherein the second material has a higher adhesive strength than the first material.

4. The display device of claim 1, wherein the first adhesive member comprises a phase change material configured to absorb heat generated from the light-emitting device.

5. The display device of claim 1, wherein the second adhesive member comprises a heat conductive adhesive tape.

6. The display device of claim 5, wherein the light incident surface is disposed at the connection surface positioned at a corner of the light guide member.

7. The display device of claim 1, wherein the light guide member comprises:
   a first surface through which the light incident the light incident surface exits toward the display panel;
   a second surface facing the first surface; and
   a plurality of connection surfaces that connect the first and second surfaces, wherein the light incident surface is disposed at one of the connection surfaces.

8. The display device of claim 1, wherein the heat discharge member comprises:
   a bottom portion that supports a portion of the light guide member; and
   a sidewall portion extending from the bottom portion and including the support surface.

9. The display device of claim 1, wherein the light source further comprises a reflective cup mounted on the second surface of the circuit board and surrounding the light-emitting device.

10. The display device of claim 1, wherein the first adhesive member comprises first and second ends opposing each other, and wherein the second adhesive member comprises a first area disposed adjacent to the first end of the first adhesive member and a second area disposed adjacent to the second end of the first adhesive member.

11. The display device of claim 1, wherein the second adhesive member has a closed loop shape to substantially surround the first adhesive member.

12. The display device of claim 1, wherein the heat discharge member comprises at least two side walls substantially perpendicular to each other, and wherein the support surface of the heat discharge member is arranged to form an oblique angle with respect to the side walls.

13. The display device of claim 12, wherein the light source is arranged to form an oblique angle with respect to the side walls.

14. The display device of claim 1, wherein the second adhesive member is formed on at least two opposing sides of the first adhesive member.

15. A display device comprising:
   a display panel;
   a light guide member disposed below the display panel and including a light incident surface;
   a heat discharge member including a support surface at least partially facing the light incident surface; and
   a light source disposed over the support surface and configured to supply light to the light incident surface, the light source comprising:
   a circuit board including first and second surfaces opposing each other;
   an adhesive member disposed between the first surface of the circuit board and the support surface and including: i) a first adhesive part in which a first adhesive material is disposed and ii) a second adhesive part in which a second adhesive material is disposed adjacent to the first adhesive part, wherein the second adhesive material is different from the first adhesive material, and the first adhesive material has a higher heat conductivity than the second adhesive material; and
   a light-emitting device disposed over the second surface of the circuit board to substantially overlap the first adhesive part and electrically connected to the circuit board.

16. The display device of claim 15, wherein the second adhesive material has a higher adhesive strength than the first adhesive material.

17. The display device of claim 16, wherein the first adhesive part is disposed at a center portion of the first surface of the circuit board, wherein the first adhesive part comprises first and second ends opposing each other, and wherein the second adhesive part comprises a first area disposed adjacent to the first end of the first adhesive part and a second area disposed adjacent to the second end of the first adhesive part.

18. The display device of claim 16, wherein the second adhesive part has a closed loop shape to substantially surround the first adhesive part.

19. The display device of claim 16, wherein the second adhesive part comprises a heat conductive adhesive material and wherein the first adhesive part is disposed at least of a phase change material.

20. A display device comprising:
   a display panel;
   a light guide member disposed below the display panel and including a light incident surface;
   a protective member that accommodates the display panel and the light guide member and includes a support surface at least partially facing the light incident surface; and
   a light source disposed on the support surface and configured to supply light to the light incident surface, the light source comprising:
      a circuit board including first and second surfaces opposing each other;
      a first adhesive member disposed between the first surface of the circuit board and the support surface;
      a second adhesive member disposed between the first surface of the circuit board and the support surface adjacent to the first adhesive member, the first adhesive member having a higher heat conductivity than the second adhesive member; and
      a light-emitting device disposed over the second surface of the circuit board to substantially overlap the first adhesive member, and wherein the light-emitting device does not overlap the second adhesive member.

21. The display device of claim 20, wherein the second adhesive member comprises a material having a higher adhesive strength than the first adhesive member.

22. The display device of claim 21, wherein the second adhesive member is disposed on the same layer as the first adhesive member.

23. The display device of claim 20, wherein the light guide member comprises:
   a first surface through which the light incident the light incident surface exits toward the display panel;
   a second surface facing the first surface; and
   a plurality of connection surfaces that connect the first and second surfaces, and
   wherein the light incident surface is disposed at the connection surface positioned at a corner of the light guide member.

* * * * *